United States Patent [19]

Cuscurida et al.

[11] Patent Number: 5,336,315
[45] Date of Patent: Aug. 9, 1994

[54] SOIL STABILIZATION PROCESS

[75] Inventors: Michael Cuscurida; Edward T. Marquis, both of Austin; Wheeler C. Crawford, Houston, all of Tex.

[73] Assignee: Texaco Chemical Company, White Plains, N.Y.

[21] Appl. No.: 22,201

[22] Filed: Feb. 25, 1993

[51] Int. Cl.⁵ .............. C04B 12/04; C04B 28/26; E02D 3/12
[52] U.S. Cl. .................. 106/633; 106/287.1; 106/634; 106/900; 166/292; 166/293; 166/266
[58] Field of Search ............ 106/633, 634, 900, 287.1; 166/292, 293; 405/266

[56] References Cited

U.S. PATENT DOCUMENTS

| | | | |
|---|---|---|---|
| 1,827,238 | 10/1931 | Joosten | 106/900 |
| 2,968,572 | 1/1961 | Peeler, Jr. | 106/900 |
| 4,043,830 | 8/1977 | Suzuki | 106/900 |
| 4,056,937 | 11/1977 | Suzuki | 61/36 B |
| 4,267,120 | 5/1981 | Cuscurida et al. | 260/463 |
| 4,359,507 | 11/1982 | Gaul et al. | 428/425.1 |
| 4,416,694 | 11/1983 | Stevenson et al. | 106/634 |
| 4,560,588 | 12/1985 | Nethe et al. | 106/900 |
| 4,561,898 | 12/1985 | Fehr et al. | 106/634 |
| 4,607,066 | 8/1986 | Barry et al. | 523/130 |
| 4,642,196 | 2/1987 | Yan | 252/88 |
| 4,773,466 | 9/1988 | Cannarsa et al. | 164/45 |
| 4,983,218 | 1/1991 | Mascioli et al. | 106/633 |
| 5,059,247 | 10/1991 | Crawford et al. | 106/634 |

FOREIGN PATENT DOCUMENTS

| | | | |
|---|---|---|---|
| 56-072075 | 6/1981 | Japan | 106/633 |
| 56-079177 | 6/1981 | Japan | 106/633 |

*Primary Examiner*—Anthony Green
*Attorney, Agent, or Firm*—James L. Bailey; Kenneth R. Priem; Walter D. Hunter

[57] ABSTRACT

This invention is concerned with a soil stabilization process in which soil particles comprising the soil surfaces to be stabilized are contacted or treated with an aqueous solution of an alkali metal silicate, such as sodium silicate, and a carbonate reactant or gelling agent selected from the group consisting of an alkylene carbonate, such as ethylene carbonate, a polyester polycarbonate and mixtures thereof. This invention also relates to soil stabilized by admixture with (1) an aqueous solution of an alkali metal silicate and (2) the carbonate reactant.

11 Claims, No Drawings

SOIL STABILIZATION PROCESS

BACKGROUND OF THE INVENTION

1. Field of the Invention:

This invention relates to a soil stabilization process. In this invention the soil particles comprising the soil surfaces to be stabilized are contacted or treated with an aqueous solution of an alkali metal silicate, such as sodium silicate, and a carbonate reactant or gelling agent selected from the group consisting of an alkylene carbonate, a polyester polycarbonate and mixtures thereof.

In another aspect this invention relates to soil stabilized by admixture with (1) an aqueous solution of an alkali metal silicate and (2) the previously described carbonate reactant.

The process of this invention is also a useful method for dust control or abatement on roads, construction sites, etc. Additionally, this process is suitable for use as a dust control method in which exposed mine surfaces are contacted or treated with the previously-described aqueous solution of an alkali metal silicate and the alkylene carbonate or polyester carbonate thereby coating the mine surfaces and lessening the possibility of dust explosions such as in coal mines.

2. Prior Art:

Silicate-based compositions useful for binding particulate matter such as soil particles are well known in the art and a number of processes in which silicate-based binder compositions suitable for use in preparing molds for metal castings have been described in the literature.

U.S. Pat. No. 4,416,694 to Stevenson et al., discloses foundry sand compositions made from a foundry sand, an aqueous sodium silicate binder and an alkylene carbonate which are used to form molds and/or cores in metal casting. The foundry sand in the foundry sand compositions disclosed by Stevenson et al., is reclaimed after the mold or core has served its purpose in metal casting.

U.S. Pat. No. 4,267,120 to Cuscurida et al., is directed to polyester polycarbonates of the type used in the practice of the present invention and to methods by which they can be prepared. Cuscurida et al., teach that the polyester polycarbonates can be used in making polymer foams including polyurethane polymers and polyisocyanurate polymers.

U.S. Pat. No. 4,359,507 to Gaul et al., discloses an adhesive binder composition for the preparation of lignocellulosic composite molded articles made from organic polyisocyanates and a liquid mixture of either ethylene carbonate or propylene carbonate with lignin and other appropriate ligno-cellulosic materials.

U.S. Pat. No. 4,773,466 to Cannarsa et al., is directed to the evaporative casting of molten metals using copolymer polycarbonates prepared from cyclohexene oxide, cyclopentene oxide, heptene oxide or isobutylene oxide and carbon monoxide.

U.S. Pat. No. 5,059,247 to Crawford et al., teaches a foundry sand composition that is self-hardening after a working life of about 10-20 minutes composed of a foundry sand, a sodium silicate binder and a specifically defined polyester polycarbonate hardener.

U.S. Pat. No. 1,827,238 to Joosten describes a process for solidifying permeable rock, loosely spread masses, etc. in which silicic acid is introduced into the mass followed by the introduction of carbon dioxide thus integrating and solidifying the treated mass.

U.S. Pat. No. 2,968,572 to Peeler, Jr. teaches a process of soil stabilization in which the soil is contacted with a single liquid mixture comprising an aqueous alkali metal silicate, an amide, such as formamide and a metal salt such as sodium aluminate thereby forming a water-insoluble gel.

U.S. Pat. No. 4,043,830 to Suzuki discloses a process for consolidation of poor quality soil by injecting hardeners comprising, for example, a mixture of water and a gelling agent and a water glass aqueous solution containing a gelling agent such as ethylene glycol diacetate.

U.S. Pat. No. 4,056,937 to Suzuki teaches a soil consolidation process in which a hardener comprising an aqueous solution of water glass and an acidic reactant, such as phosphoric acid, is injected into the soil thereby solidifying the treated soil.

U.S. Pat. No. 4,607,066 to Barry et al., discloses a process for coating geological formations and mine stoppings by applying to those substrates an aqueous sealant composition comprising a watersoluble or water dispersible polymeric binder, filter material and water and allowing the composition to dry to form an air flow resistant coating on the substrates.

U.S. Pat. No. 4,642,196 to Yah teaches a method and composition for controlling dust occurring in the production, handling, transport and storing of coal which includes applying such as by spraying an aqueous solution of a gelatinized starch.

U.S. Pat. No. 4,983,218 to Mascioli discloses a composition and method for hardening an alkali metal silicate solution using blends of alkylene diols, polyoxyalkylene glycols or hydroxyalkyl ethers. The hardened alkali metal silicate compositions are useful as binders in the preparation of foundry molds or in other applications requiring agglomeration of particulate matter.

SUMMARY OF THE INVENTION

This invention relates to a soil stabilization method which comprises contacting the soil with an alkali metal silicate, such as sodium silicate, and a carbonate reactant selected from the group comprising (a) an alkylene carbonate, such as ethylene carbonate or propylene carbonate, and (b) a polyester polycarbonate having the formula:

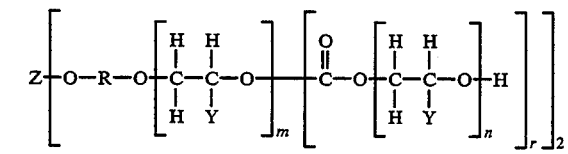

wherein Y is H or methyl,
wherein m and n are positive numbers having a value of 1 to about 5,
wherein R is a polyoxyethylene or a polyoxypropylene group having an average molecular weight between about 62 and 600,
wherein r is a positive integer having a value of 1 to 5,
wherein Z is a difunctional group formed by the reaction of an acid anhydride with a polyoxyethylene glycol or a polyoxypropylene glycol, and
wherein the acid anhydride is an anhydride of an organic acid selected from the group consisting of maleic anhydride, succinic anhydride and phthalic anhydride,
and mixtures of (a) and (b).

In other aspect this invention relates to a method for dust control on roads, construction sites, etc. and this invention also relates to a dust control method in which exposed mine surfaces, such as in coal mines, are contacted or treated with the previously-described alkali metal silicate and an alkylene carbonate or a polyester polycarbonate and mixtures thereof.

In this invention the carbonates, i.e., the alkylene carbonates or polyester polycarbonates, for example, react with the alkali metal silicate in the soil stabilization process to form silica polymers thereby providing protection to the soil from erosive action including that resulting from wind, rain, etc.

DESCRIPTION OF THE PREFERRED EMBODIMENTS

In treating the soil to be stabilized in this invention the aqueous silicate solution and the carbonate reactant can be employed together to contact the soil provided, after mixing the silicate solution and the carbonate reactant, the mixture is applied to soil within a period of about 15 seconds to about 15 minutes since on mixing the silicate and carbonate will, within a short time, start to gel and afterwards set up to form a hard mass as the silicate polymer reaction product is formed. Alternatively, the soil to be stabilized can first be treated or contacted, such as by spraying with alkali metal silicate following which the soil is treated or contacted, likewise by spraying with the carbonate reactant, or, if desired, the carbonate reactant can be applied first followed by the application of the aqueous silicate solution.

The preparation of the polyester polycarbonates useful in this invention which are more completely described in U.S. Pat. No. 4,267,120 to Cuscurida et al., is incorporated herein by reference in its entirety.

The useful polyester polycarbonates have the formula:

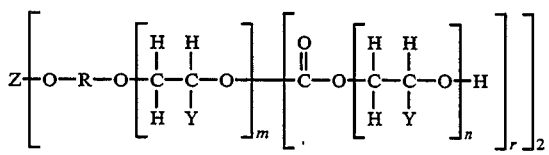

wherein Y is H or methyl,
wherein m and n are positive numbers having a value of 1 to about 5,
wherein R is a polyoxyethylene or a polyoxypropylene group having an average molecular weight between about 62 and 600,
wherein r is a positive integer having a value of 1 to 5,
wherein Z is a difunctional group formed by the reaction of an acid anhydride with a polyoxyethylene glycol or a polyoxypropylene glycol, and
wherein the acid anhydride is an anhydride of an organic acid selected from the group consisting of maleic anhydride, succinic anhydride and phthalic anhydride.

The polyester polycarbonates are made from an organic acid anhydride, namely, maleic anhydride, succinic anhydride or phthalic anhydride, polyoxyethylene or polyoxypropylene glycols, carbon dioxide, ethylene oxide, propylene oxide or ethylene carbonate or propylene carbonate.

The polyester polycarbonates can be prepared by any one of the several methods disclosed in U.S. Pat. No. 4,267,120.

Thus, the polyester polycarbonates can be obtained by the reaction of the acid anhydride with ethylene oxide or propylene oxide, carbon dioxide and a polyoxyethylene or polyoxypropylene glycol in the presence of a basic catalyst. The resultant polyester polycarbonates are terminated with hydroxyl groups, have molecular weights within the range of about 220 to about 2,000 and have hydroxyl numbers within the range of about 50 to about 400.

In accordance with one method of preparation, the organic acid anhydride, the polyoxyethylene or polyoxypropylene glycol, the ethylene oxide or propylene oxide and carbon dioxide or ethylene carbonate and propylene carbonate are simultaneously brought into contact with a basic catalyst at an elevated temperature.

In accordance with another method, the acid anhydride, the polyoxyethylene or polyoxypropylene glycol and ethylene carbonate or propylene carbonate are simultaneously brought into contact with a basic catalyst at an elevated temperature. In this situation, the cyclic carbonate will, in the reaction environment, form the corresponding epoxide and carbon dioxide.

In yet another embodiment, the acid anhydride is initially reacted with the polyoxyethylene or polyoxypropylene glycol to form a mixture comprising the half ester and/or the diester of the acid anhydride. The resultant reaction mixture is then brought into contact with ethylene oxide or propylene oxide and with carbon dioxide or ethylene carbonate or propylene carbonate to provide the desired polyester polycarbonate product.

The polyoxyethylene and polyoxypropylene glycols to be used in accordance with the present invention are glycols having a molecular weight of about 62 to about 600.

Carbon dioxide is provided in the form of solid or gaseous carbon dioxide or by using ethylene carbonate or propylene carbonate, which are cyclic materials, which can be used to form ethylene oxide or propylene oxide and carbon dioxide in situ.

The cyclic ethylene and propylene carbonates have the formula:

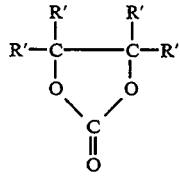

wherein R' represents hydrogen or methyl.

In preparing the polyester polycarbonates, the polyoxyethylene or polyoxypropylene glycol and the organic acid anhydride are employed in the mole ratio of from about 1:1 to about 10:1. The ethylene oxide and propylene oxide and the carbon dioxide, as such, or as ethylene or propylene carbonate, is employed in the mole ratio of about 1:1 to about 4:1.

The basic catalyst that can be used to promote the formation of the polyester polycarbonates include alkali metal and alkaline earth metal carbonates such as sodium carbonate, potassium carbonate, magnesium carbonate, potassium stannate, sodium stannate and the like. The polyester polycarbonate reactions are normally conducted at a temperature within the range of about 100° to about 200° C.

In the soil stabilization process of this invention generally, the amount of the aqueous silicate solution employed will range from 85 to about 95 wt. % based on the total weight of the aqueous silicate solution and the weight of the carbonate reactant consisting of an alkylene carbonate and/or polyether polycarbonate utilized to contact the soil. Preferably, the amount of the carbonate reactant utilized in the soil stabilization process of this invention will range from 5 to about 10 wt. %, based on the total weight of the aqueous silicate solution and the weight of the carbonate reactant.

When the carbonate reactant comprises a mixture of alkylene carbonate and polyester polycarbonate usually the alkylene carbonate present will comprise about 25 to about 75 wt. % of the mixture with the balance being the polyester polycarbonate.

Alkylene carbonates useful in this invention include ethylene carbonate, propylene carbonate, etc. Alkali metal silicates suitable for use in the soil stabilization process of this invention include sodium and potassium silicates and mixtures thereof. It is important in this invention to use an aqueous solution of the alkali metal silicate. The aqueous alkali metal silicate solution generally will contain about 40 to 60 wt. % of the silicate. In some instances it may be desirable to dilute the metal silicate solution with additional water to form a solution containing 20–40 wt. % of the silicate.

Because of the lower cost and wide availability, sodium silicate is the preferred alkali metal silicate. The ratio of $SiO_2/Na_2O$ in the sodium silicate solution employed is important and in this invention this ratio is required to be within the range of about 2.2 to 3.0. It is preferred to contact the soil surfaces with the silicate solution and the carbonate reactant at a temperature of about 60° to about 100° F.

The term "soil" as used in this specification and claims is intended to refer to various types and compositions of soil, including sand, top soil, loam, porous or fissured rock, etc.

It is pointed out that the proportions of the alkali metal silicate and the carbonate reactant concentrations of these materials, etc. as well as the amount of soil to be treated with a given quantity of the stabilizing compositions of this invention will vary widely depending upon the porosity, permeability, type of soil, nature of substrata, etc. Accordingly, it is generally not feasible to define in terms of proportions of the treating compositions which represent the best materials for use in types of soil stabilization.

EXAMPLE 1

This example will show the use of propylene carbonate/sodium silicate as a stabilizer for sand.

Fill sand (ASTM C-33) was thoroughly mixed with propylene carbonate and 40°–42° Be ($SiO_2/Na_2O$) sodium silicate solution. This mixture was then evenly spread onto an 8½×9 in. plastic plate and dried overnight at 80°–90° C. The sand-covered plate was then placed on the plant roof and exposed to the elements for 40 days. During the test period the temperature ranged from a high of approximately 95° F. to a low of 74° F. The sand was intermittently weighed and the weight loss determined. As a control, the loss in weight of untreated sand was determined.

| Sample No. | 6869 67A | 6869 67B | 6869-67C (Control) |
|---|---|---|---|
| Composition, pbw | | | |
| Sand | 200 | 200 | 200 |
| Propylene carbonate | 2 | 1 | — |
| Sodium silicate | 18 | 9 | — |
| Exposure, days | | Wt. loss % | |
| 7 | 8.0 | 2.9 | 10.7 |
| 20 | 8.2 | 4.7 | 17.4 |
| 34 | 11.4 | 7.3 | 24.5 |
| 48 | 13.6 | 9.8 | 29.7 |

These data show that the sand samples as treated with the propylene carbonate/sodium silicate were substantially more stable (as measured by weight loss) than the untreated control sample.

EXAMPLE 2

This example will show the use of polyester polycarbonate/sodium silicate as a stabilizer for sand.

The polyester polycarbonate utilized in this example was prepared as described in Example 1 of U.S. Pat. No. 4,267,120. This polycarbonate was prepared by the reaction of 0.405 lb. ethylene glycol, 0.97 lb. phthalic anhydride, 8.62 lb. ethylene carbonate and 9.1 g potassium stannate catalyst. The polyester polycarbonate had the following properties:

| Properties | Sample No. 4725-75 |
|---|---|
| Hydroxyl no., mg KOH/g | 224 |
| Saponification no. mg KOH/g | 236 |
| Carbon dioxide content, wt. % | 23.6 |
| Viscosity, 77° F., cps | 1984 |

It will further show the use of cyclic alkylene carbonates such as ethylene carbonate (EC) and propylene carbonate (PC) in this reaction.

Using the procedure of Example 1, 200 g sand (ASTM-C-33) was mixed with 2 g of the polyester polycarbonate prepared as described above and 18 g of sodium silicate solution. During the test period, the temperature ranged from a high of about 95° F. to a low of 74° F.

| Sample No. | 6869-68A | 6869-67C (Control) |
|---|---|---|
| Exposure, days | Wt. loss % | |
| 7 | 12.9 | 10.7 |
| 20 | 12.8 | 17.4 |
| 34 | 17.0 | 24.5 |
| 48 | 20.8 | 29.7 |

These data show that the weight loss of the sand sample stabilized with the polyester polycarbonate/sodium silicate was substantially less than that of the untreated control sample.

What is claimed is:

1. Soil stabilized by admixture with (1) an aqueous solution of an alkali metal silicate and (2) a carbonate reactant comprising a mixture of about 25 to about 75 wt. % of (a) an alkylene carbonate based on the weight of the mixture with the balance being (b) a polyester polycarbonate of the formula:

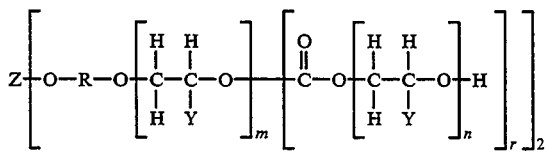

wherein Y is H or methyl, wherein m and n are positive numbers having a value of 1 to about 5, wherein R is a polyoxyethylene or a polyoxypropylene group having an average molecular weight between about 62 and 600, wherein r is a positive integer having a value of 1 to 5, wherein Z is a difunctional group formed by the reaction of an acid anhydride with a polyoxyethylene glycol or a polyoxypropylene glycol, and wherein the acid anhydride is an anhydride of an organic acid selected from the group consisting of maleic anhydride, succinic anhydride and phthalic anhydride, wherein the aqueous solution contains about 40 to about 60 wt. % of the said alkali metal silicate, and wherein the amount of the aqueous silicate solution employed ranges from 85 to 95 wt. % based on the total weight of the aqueous silicate solution and the weight of the carbonate reactant.

2. The stabilized soil of claim 1 wherein the alkali metal silicate is sodium silicate.

3. The stabilized soil of claim 2 wherein the ratio of SiO$_2$/Na$_2$O in the sodium silicate ranges from 2.2 to 3.0.

4. A composition suitable for use in stabilizing soil which comprises (1) an aqueous solution of an alkali metal silicate and (2) a carbonate reactant comprising a mixture of about 25 to about 75 wt. % of (a) an alkylene carbonate based on the weight of the mixture with the balance being (b) a polyester polycarbonate of the formula:

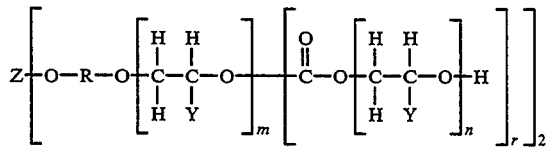

wherein Y is H or methyl, p0 wherein m and n are positive numbers having a value of 1 to about 5, wherein R is a polyoxyethylene or a polyoxypropylene group having an average molecular weight between about 62 and 600, wherein r is a positive integer having a value of 1 to 5, wherein Z is a difunctional group formed by the reaction of an acid anhydride with a polyoxyethylene glycol, and wherein the acid anhydride is an anhydride of an organic acid selected from the group consisting of maleic anhydride, succinic anhydride and phthalic anhydride, wherein the aqueous solution contains about 40 to about 60 wt. % of the said alkali metal silicate, and wherein the amount of the aqueous silicate solution employed ranges from 85 to about 95 wt. % based on the total weight of the aqueous silicate solution and the weight of the carbonate reactant.

5. The composition of claim 4 wherein the alkali metal silicate is sodium silicate.

6. The composition of claim 5 wherein the ratio of SiO$_2$/Na$_2$O in the sodium silicate ranges from 2.2 to 3.0.

7. A soil stabilization process which comprises contacting the soil with (1) an aqueous solution of an alkali metal silicate and (2) a carbonate reactant comprising a mixture of about 25 to about 75 wt. % of (a) an alkylene carbonate based on the weight of the mixture with the balance being (b) a polyester polycarbonate of the formula:

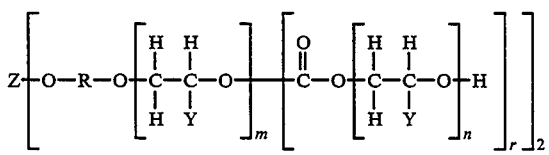

wherein Y is H or methyl, wherein m and n are positive numbers having a value of 1 to about 5, wherein R is a polyoxyethylene or a polyoxypropylene group having an average molecular weight between about 62 and 600, wherein r is a positive integer having a value of 1 to 5, wherein Z is a difunctional group formed by the reaction of an acid anhydride with a polyoxyethylene glycol or a polyoxypropylene glycol, and wherein the acid anhydride is an anhydride of an organic acid selected from the group consisting of maleic anhydride, succinic anhydride and phthalic anhydride, wherein the aqueous solution contains about 40 to about 60 wt. % of the said alkali metal silicate, and wherein the amount of the aqueous silicate solution employed ranges from 85 to 95 wt. % based on the total weight of the aqueous silicate solution and the weight of the carbonate reactant.

8. The process of claim 7 wherein the alkali metal silicate is sodium silicate and the ratio of SiO$_2$/Na$_2$O in the sodium silicate ranges from 2.2 to 3.0.

9. The process of claim 7 wherein the alkylene carbonate is ethylene carbonate.

10. The process of claim 7 wherein the alkylene carbonate is propylene carbonate.

11. The process of claim 7 wherein the said polyester polycarbonate has a hydroxyl number within the range of about 175 to about 350.

* * * * *